United States Patent [19]

Seki et al.

[11] Patent Number: 4,939,635
[45] Date of Patent: Jul. 3, 1990

[54] AUTOMATIC PROGRAMMING SYSTEM

[75] Inventors: Masaki Seki; Takashi Takegahara; Takeshi Arakaki, all of Tokyo, Japan

[73] Assignee: Fanuc Ltd, Minamitsuru, Japan

[21] Appl. No.: 231,838

[22] PCT Filed: Oct. 15, 1987

[86] PCT No.: PCT/JP87/00776
§ 371 Date: Jun. 15, 1988
§ 102(e) Date: Jun. 15, 1988

[87] PCT Pub. No.: WO88/03284
PCT Pub. Date: May 5, 1988

[30] Foreign Application Priority Data

Oct. 21, 1986 [JP] Japan .................................. 61-250361

[51] Int. Cl.$^5$ ...................... G05B 19/403; G06F 3/04
[52] U.S. Cl. .................................... 364/191; 364/188;
364/474.22; 364/474.23; 364/474.26
[58] Field of Search .............. 364/191, 474.22–474.27,
364/188–190, 146; 340/706, 707

[56] References Cited

U.S. PATENT DOCUMENTS 4,451,895  5/1984  Sliwkowski .................. 364/521
4,627,003 12/1986  Kishi et al. .................. 364/520

Primary Examiner—Jerry Smith
Assistant Examiner—Paul Gordon
Attorney, Agent, or Firm—Staas & Halsey

[57] ABSTRACT

A menu table (108b) having a number of menu items conforming to various methods of defining points, straight lines and circles is affixed to a tablet surface (108a). In a state where predetermined points, straight lines and circles are displayed on a CRT (106), a predetermined menu item (MN) on the menu table (108b) is picked by a tablet cursor (108c), thereby designating a method of defining a figure element. Next, figure element ($S_i$, $S_j$) displayed on the display screen are designated by a graphic cursor (GSC). In this way a new figure element ($P_m$) is defined using the picked figure definition method and the picked figure elements ($S_i$, $S_j$), and the new figure element is stored in the RAM (103) and displayed on a display screen.

3 Claims, 3 Drawing Sheets

FIG. 2

AUTOMATIC PROGRAMMING SYSTEM

BACKGROUND OF THE INVENTION

This invention relates to an automatic programming system. More particularly, the present invention is directed to an automatic programming system for automatically creating an NC part program, executed by an NC unit, from a figure definition statement and motion definition statement prepared in an automatic programming language.

In an automatic programming apparatus for creating NC data using an automatic programming language such as APT or FAPT, (a) a part program based on the automatic programming language is created by defining points, straight lines and circular arcs using simple symbols (this is referred to as "figure definition"), and then defining a tool path using the defined points, straight lines and circular arcs (referred to as "motion statement definition"), and (b) the part program based on the automatic programming language is subsequently converted, by using an NC data output table, into NC data comprising NC data (EIA codes or ISO codes) in a format capable of being executed by an NC unit.

For example, in the creation of a part program for moving a tool RB along a profile comprising straight lines and circular arcs shown in FIG. 3, figure definition is performed by defining a tool starting point $P_1$, cutting starting point $P_2$, straight lines $S_1$ and $S_2$ and circular arc $C_1$ . . . as follows:

| | | |
|---|---|---|
| PART, @ REIDAI | (1) | |
| MCHN, MILL, ABS | (2) | |
| $P_1 = x_1, y_1$ | | |
| $P_2 = x_2, y_2$ | | |
| $P_3 = x_3, y_3$ | | |
| $S_1 = P_2, P_3$ | (3) | |
| $C_3 = x_4, y_4, r_1$ | (4) | |
| $P_5 = x_5, y_5$ | | |
| $S_2 = P_5, C_1, B$ | (5) | |

Thereafter, by using these defined points, straight lines and circular arcs, a motion statement is defined in automatic programming language. The motion statement is described by the following and in the view of the tool path:

| | |
|---|---|
| CUTTER, 0.3 | (6) |
| S0800 | (7) |
| TLLFT | (8) |
| FROM, $P_1$ | (9) |
| RPD, TO, $S_1$, $P_2$ | (10) |
| FCOD, 500 | (11) |
| $S_1$ | |
| $C_1$ | |
| $S_2$ | |
| . . . | |
| FINI | |
| PEND | |

When this is inputted to an automatic programming unit, the latter subsequently automatically creates and outputs NC data having an EIA code or ISO code execution format while referring to an NC data output table.

In the foregoing, (1) instructs the start of the part program, with "REIDAI" being the header.

(2) indicates the type of NC machine. "MILL" is used in case of milling, "TURN" in case of turning, and "CUT" in case of a wire-cut electrical discharge machine. "ABS" indicates an absolute command. ("INCR" would be used for an incremental command.)

(3) signifies a straight line passing through points $P_2$ and $P_3$.

(4) signifies a circular arc having a center $(x_4, y_4)$ and a radius $r_1$.

(5) signifies a lower tangent line (straight line) of two tangent lines passing through point $P_5$ and contacting the circular arc $c_1$. In the case of the upper tangent line, the alphabetic character A would be used instead of B.

(6) represents a beam command which commands a beam diameter of 0.3 mm.

(7) represents a command which commands a spindle rotational speed of 800 (rpm).

(8) is a command for offsetting the tool to the left of the direction of movement. ("TLRGT" would be used to offset the tool to the right of the direction of movement.)

(9) is a coordinate system setting command which indicates that the starting point is $P_1$.

(10) is a command for positioning the cutter in such a manner that the tool will contact the straight line $S_1$ at point $P_2$ without passing this straight line.

(11) is a velocity command indicating that the feed velocity is 500 mm/min.

Thus, according to the automatic programming method, symbols are previously attached to shape elements such as straight lines, circles and points constructing the shape of a part. These shape elements are defined (figure definition), a motion definition statement is subsequently created using the symbols attached to the shape elements, and an NC part program is created automatically using these figure and motion definition statements.

In prior art figure definition, the point, straight line and circle figure elements are defined by methods described hereinafter. In the case of a point, a variety of methods are available. For example:

(i) the coordinates of the point, namely $$P_i = x_i, y_i$$

are directly input from a keyboard to define the point; or (ii) by using two straight lines $S_m$ and $S_n$, $$P_i = S_m, S_n$$

is input from a keyboard to define the point as the point of intersection between the two straight lines; or (iii) by using a straight line $S_m$ and a circular arc $C_n$, $$P_i = S_m, C_n, L \text{ (or R)}$$

is input from a keyboard to define the point as the left point of intersection (of the two points of intersection) between the straight line and the circular arc (or the right point of intersection in case of R). The point can also be defined as the point of tangency between two circular arcs. In the case of a straight line, a variety of methods are available. For example:

(i) by using two points $P_i$, $P_j$, $$S_m = P_i, P_j$$

is input from a keyboard to define the straight line as one passing through these two points; or (ii) by using one point $P_i$ and a circular arc $C_i$, $$S_m = P_i, C_j, A \text{ (or B)}$$

is input from a keyboard to define the straight line as one passing through the point $P_i$ and tangent to the circular arc $C_j$ on the upper side (or the lower side in case of B); or one point and an angle $\alpha$ with respect to a horizontal line are input to define the straight line as one passing through the point and defining the angle $\alpha$ with the horizontal line. In the case of a circular arc, a variety of methods are available. For example:

(i) by using one point $P_i$ and a straight line $S_j$, $$C_m = P_i, S_j$$

is input from a keyboard to define the circular arc as one tangent to the straight line $S_j$ and having $P_i$ as its center; or (ii) by using three points $P_i$, $P_j$, $P_k$, $$C_m = P_i, P_j, P_k$$

is inputted from the keyboard to define arc as one passing through these three points. The circular arc can also be defined by specifying the center of the arc and its radius.

Thus, in the prior art, a figure definition statement is input from a keyboard using symbols attached to figure elements, thereby defining new figure elements. Consequently, figure definition is troublesome and cannot be rapidly performed.

Accordingly, an object of the present invention is to provide an automatic programming system capable of defining new figure elements without requiring an input of a figure definition statement from a keyboard and without using symbols affixed to figure elements.

SUMMARY OF THE INVENTION

The system of the invention is characterized by providing a tablet surface with a menu table having menu items conforming to various methods of defining points, straight lines and circles, displaying previously input figure elements on a display screen, designating a figure element definition method by picking a prescribed menu item on the menu table, picking a prescribed figure element displayed on the display screen, defining a new figure element using the picked figure element definition method and the picked figure element, storing the new figure element in a memory, and displaying the new figure element on the display screen.

BRIEF DESCRIPTION OF THE DRAWINGS

FIG. 2 is a major portion of a menu table;

DESCRIPTION OF THE PREFERRED EMBODIMENTS

Figure 1:
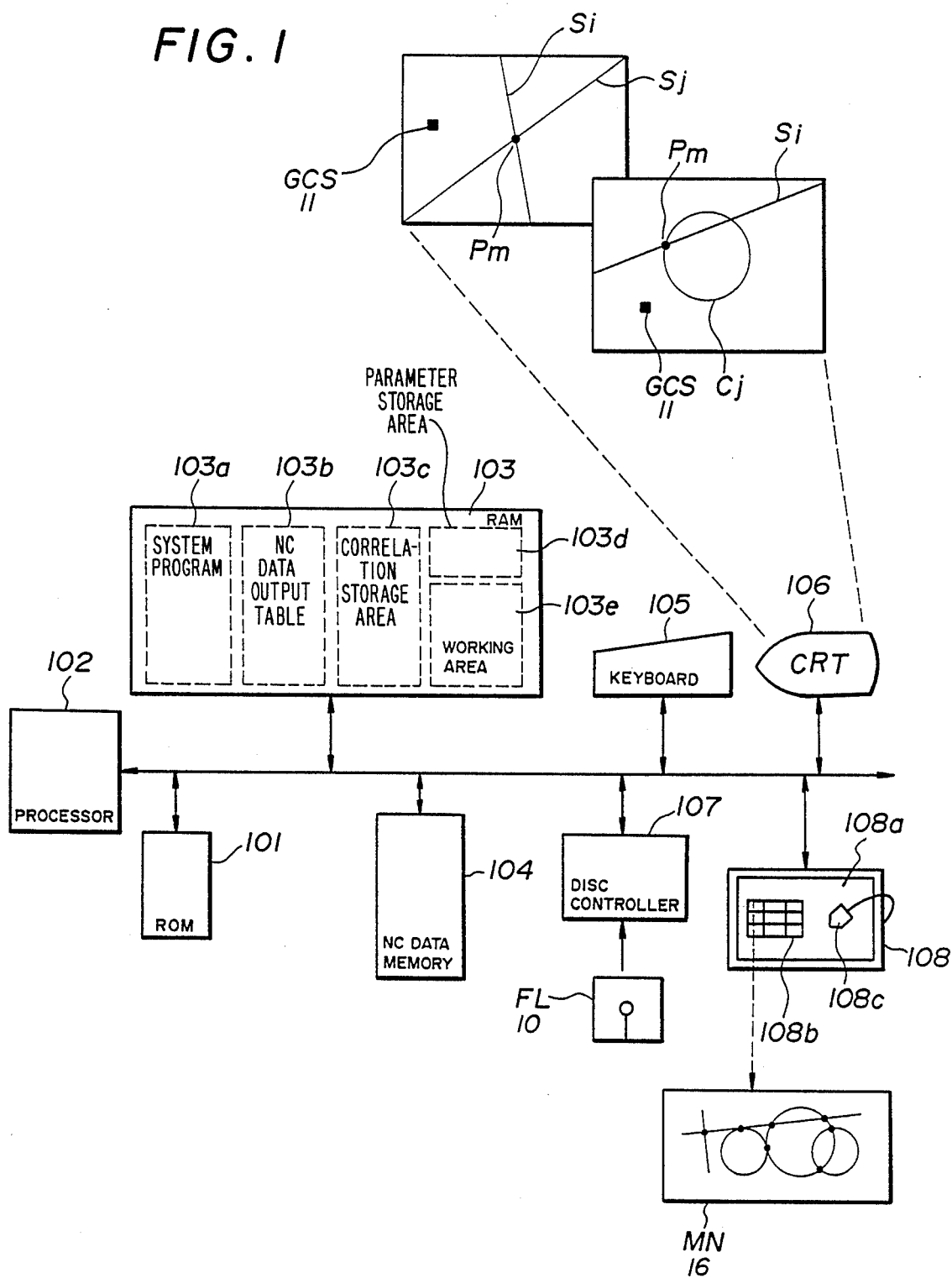
FIG. 1 is a block diagram of an automatic programming system according to the present invention.
Figure 3:
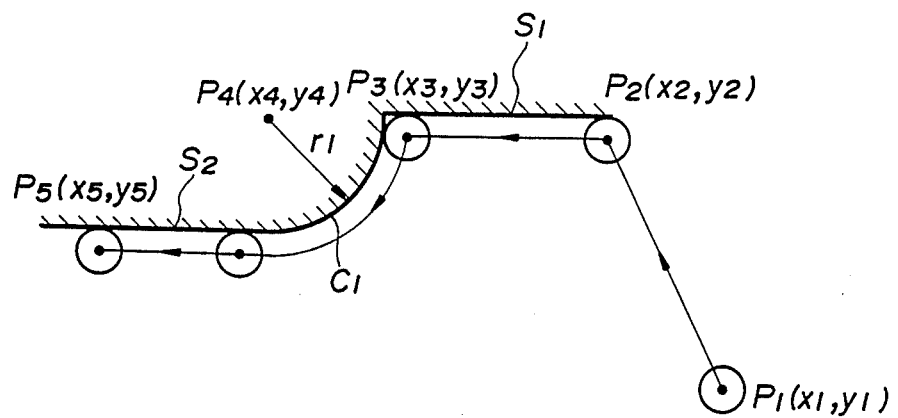
FIG. 3 is a diagram for describing the prior-art method.

FIG. 1 is a block diagram of an automatic programming apparatus according to an embodiment of the present invention.

Numeral 101 denotes a ROM storing a loading program and the like, 102 denotes a processor for executing automatic programming processing, and 103 denotes a RAM.

The RAM 103 has a storage area 103a for storing a system program STPR read in from a floppy FL, a storage area 103b for storing an NC data output table, a storage area 103c for storing a correlation FNT between function codes NF and data output formats NC, a storage area 103d for storing various parameters PRM, and a working area 103e. An NC data output table NCDT stored in the storage area 103b has a plurality of function codes specifying NC data output formats for each command (for setting a coordinate system, positioning, linear cutting, circular arc cutting, tool selection, etc.).

Numeral 104 denotes an NC data memory for storing the NC data created, 105 denotes a keyboard, 106 denotes a display unit (CRT), 107 denotes a disc controller, and 108 denotes a tablet device having a tablet MN surface 108a to which a menu table 108b having menu items conforming to various methods of defining points, straight lines, circles and the like is affixed. Prescribed menu items are picked by a tablet cursor 108c. A graphic cursor GCS 11 on a display screen is moved by moving the cursor 108a on the tablet surface.

FL 10 represents a floppy disc.

Figure 2:
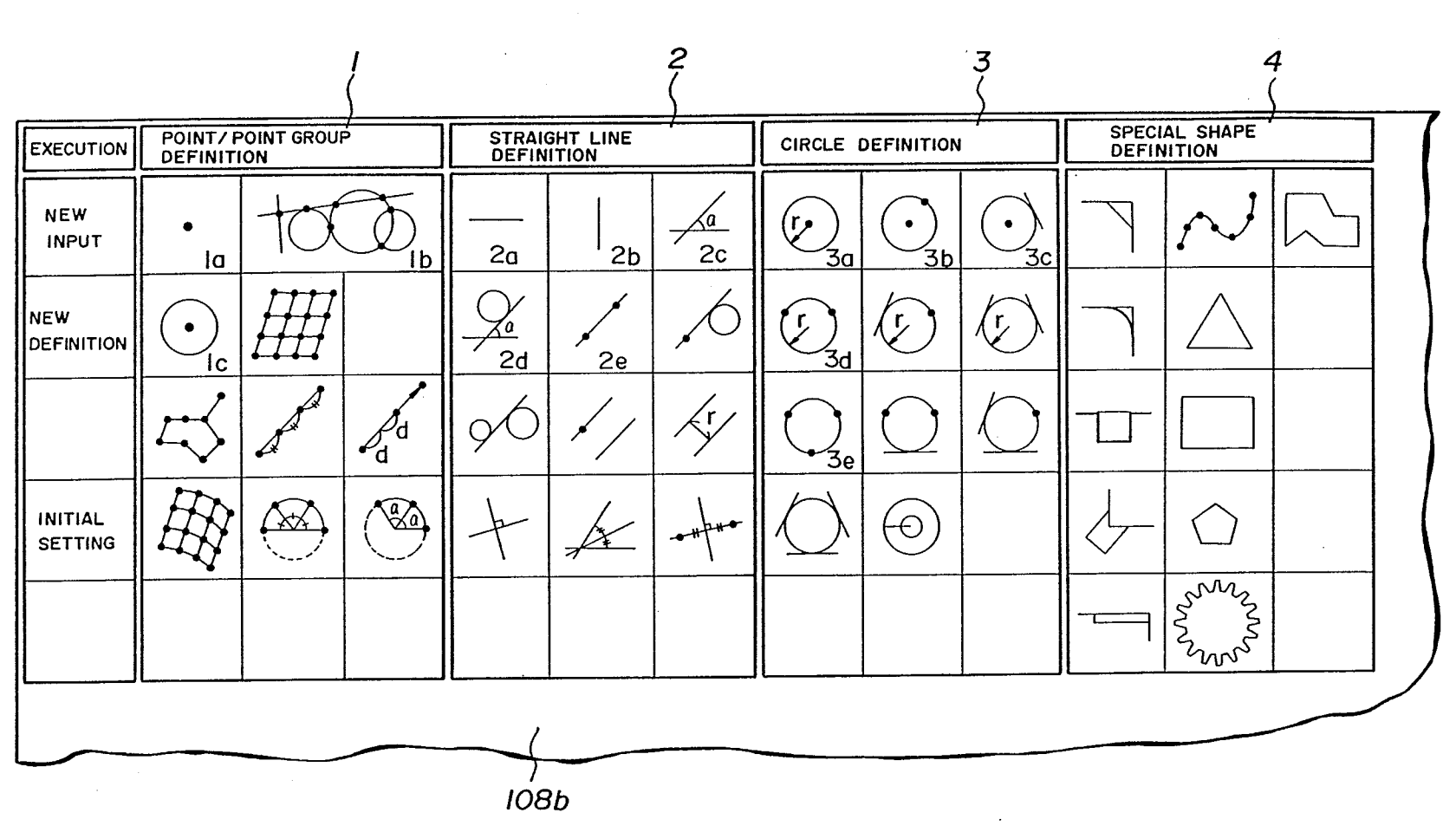

FIG. 2 is a main portion of the menu table 108b. Numeral 1 is a "POINT/POINT GROUP DEFINITION" section, 2 a "STRAIGHT LINE DEFINITION" section, 3 a "CIRCLE DEFINITION" section, and 4 a "SPECIAL SHAPE DEFINITION" section. The menu items in these definition sections are provided with drawings each indicating a method of definition.

Picking item 1a in the "POINT/POINT GROUP DEFINITION" section 1 designates a definition method for defining a point by directly inputting the coordinates of the point using a keyboard or cursor.

Picking item 1b designates a definition method for defining a point and a point of intersection between two straight lines, a point of tangency between a straight line and a circle, a point of intersection between a straight line and a circle, a point of tangency between two circles, or a point of intersection between two circles.

Picking item 1c designates a definition method for defining a point as the center of a circle. Prescribed groups of points are defined by designating other items.

Picking item 2a in the "STRAIGHT LINE DEFINITION" section 2 designates a definition method for defining a straight line passing through a designated point and parallel to a horizontal line.

Picking item 2b designates a definition method for defining a straight line passing through a designated point and parallel to a vertical line.

Picking item 2c designates a definition method for defining a straight line passing through a designated point and intersecting a horizontal line at a designated angle.

Picking item 2d designates a definition method for defining a straight line tangent to a designated circle and intersecting a horizontal line at a designated angle.

Picking item 2e designates a definition method for defining a straight line passing through two designated points. Predetermined methods of defining straight lines are designated by designating other items.

Picking item 3a in the "CIRCLE DEFINITION" section 3 designates a definition method for defining a circle having a designated point as center and a designated radius.

Picking item 3b designates a definition method for defining a circle having a designated point as center and passing through another designated point.

Picking item 3c designates a definition method for defining a circle having a designated point as center and tangent to a designated straight line.

Picking item 3d designates a definition method for defining a circle passing through two designated points and having a designated radius.

Picking item 3e designates a definition method for defining a circle passing through three designated points. Similarly, picking other items designates predetermined methods of defining circles.

Processing performed by the automatic programming system of the present invention will now be described.

Prior to processing, the system program for creating an NC part program, the NC data output table NCDT, the function code data NF, data output format NC and a correlation FNT between the two and the parameters PRM are stored in the storage areas $103a$–$103d$ of the RAM 103 from the floppy disc FL.

First, a definition statement for a point, straight line, circle or the like necessary in terms of promoting figure definition according to the present invention is input from the keyboard 105, stored in the working area $103e$ of RAM 103 and displayed on the CRT 106, just as in the prior art. FIG. 1 shows an example of a display in which two straight lines $S_i$ and $S_j$ appear, and an example of a display in which a straight line $S_i$ and a circle $C_j$ appear.

If the point of intersection between two straight lines (or the point of intersection between a straight line and a circular arc) is defined as the point, the item 1b in the "POINT/POINT GROUP DEFINITION" section 2 on menu table 108b is picked by the tablet cursor 108c.

Next, the tablet cursor 108c is moved to designate, by means of the graphic cursor GSC, the two straight lines $S_i$ and $S_j$ (or the straight line $S_i$ and circle $C_j$) displayed on the display screen.

As a result, the processor 102, which is under the control of the system program for automatic programming, uses the picked figure definition method and the picked figure elements $S_i$ and $S_j$ (or $S_i$ and $C_j$) to define a new figure element (point) $P_m$ as $P_m = S_i, S_j$ or $P_m = S_i, C_j, L$ (or R)

The defined figure element is stored in the RAM 103 and the point is displayed on the display screen as a black circle.

Thereafter, new figure elements are defined in a similar manner.

When a point is to be defined as a point of intersection between a straight line and a circle, there will be two points of intersection, that is, left and right points of intersection. Therefore, it is necessary to specify which point of intersection is desired. The point of intersection selected is that near the point designated when the circle is designated by the graphic cursor.

The symbols of points, straight lines and circles are expressed by attaching suffixes to the alphabetic characters P, S and C, respectively, and these suffixes are incremented in the order in which the corresponding figure elements are defined.

When figure definition is completed by the foregoing operations, a motion definition statement is input as in the prior art, and the processor 102 uses the figure definition statement and motion definition statement to create an NC part program, which is then stored in the memory 104.

According to the present invention, a tablet surface is provided with a menu table having menu items conforming to various methods of defining points, straight lines and circles. Previously input figure elements are displayed on a display screen. A figure element definition method is designated by picking a prescribed menu item on the menu table, a prescribed figure element displayed on the display screen is picked, and a new figure element is defined using the picked figure element definition method and the picked figure element. Accordingly, new figure elements can be defined without requiring an input of a figure definition statement from a keyboard and without using symbols attached to figure elements. Figure definition is thus simplified.

The foregoing is considered as illustrative only of the principles of the invention. Further, since numerous modifications and changes will readily occur to those skilled in the art, it is not desired to limit the invention to the exact construction and application shown and described herein, and accordingly, all suitable modifications and equivalents may be resorted to, falling within the scope of the invention and the appended claims and their equivalents.

We claim:

1. An automatic programming method for creating a numerical control part program by defining figure elements such as straight lines, circles and points constructing a part profile, defining a tool path by using symbols attached to the figure elements, and creating the numeral control part program by using a figure element definition statement for defining the figure elements and a motion statement for defining the tool path, said method comprising the steps of:
    (a) providing a tablet surface with a menu table having menu items conforming to various methods of defining points, straight lines and circles;
    (b) displaying previously input figure elements on a display screen;
    (c) picking a menu item on the menu table for specifying the kind of new figure element to be defined and a figure element definition method for defining the new figure element;
    (d) picking at least one figure element displayed on the display screen in accordance with the specified kind of figure element and the specified figure element definition method;
    (e) defining a new figure element using the designated figure element definition method and the picked figure element and storing the new figure element in a memory; and
    (f) displaying the new figure element on the display screen.

2. An automatic programming method according to claim 1, wherein said step (a) comprises the substep of providing each menu item in the menu table with a figure illustrating a definition method.

3. An automatic programming system according to claim 1, further comprising the step of incrementing the number attached to the symbols indicating points, straight lines and circles in the order in which definitions are made, thereby distinguishing each defined point, straight line and circle from other points, straight lines and circles.

* * * * *